(12) United States Patent
Takeya

(10) Patent No.: US 6,804,083 B2
(45) Date of Patent: Oct. 12, 2004

(54) THIN-FILM MAGNETIC HEAD PROVIDED WITH SMEAR-PREVENTING LAYER

(75) Inventor: Tsutomu Takeya, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 587 days.

(21) Appl. No.: 09/938,047

(22) Filed: Aug. 23, 2001

(65) Prior Publication Data

US 2002/0024764 A1 Feb. 28, 2002

(30) Foreign Application Priority Data

Aug. 25, 2000 (JP) ........................................ 2000-256413

(51) Int. Cl.[7] .......................... G11B 5/187; G11B 5/127; G11B 5/33
(52) U.S. Cl. ........................................ 360/122; 360/317
(58) Field of Search ................................. 360/323, 122, 360/125, 126, 128, 317, 319; 29/603.21, 603.01

(56) References Cited

U.S. PATENT DOCUMENTS

| | | | | |
|---|---|---|---|---|
| 4,837,923 A | * | 6/1989 | Brar et al. | 29/603.18 |
| 4,851,890 A | * | 7/1989 | Miyatake | 257/223 |
| 4,967,301 A | * | 10/1990 | Lopez et al. | 360/128 |
| 5,003,423 A | * | 3/1991 | Imamura et al. | 360/125 |
| 5,084,794 A | * | 1/1992 | Smith | 360/315 |
| 5,193,038 A | * | 3/1993 | Smith | 360/315 |
| 5,357,388 A | * | 10/1994 | Smith | 360/315 |
| 5,473,492 A | * | 12/1995 | Terunuma et al. | 360/319 |
| 5,491,600 A | * | 2/1996 | Chen et al. | 360/322 |
| 5,603,156 A | | 2/1997 | Biskeborn et al. | 29/603.15 |
| 5,735,036 A | | 4/1998 | Barr et al. | 29/603.12 |
| 5,749,769 A | | 5/1998 | Church et al. | 451/5 |
| 5,764,446 A | | 6/1998 | Seagle | 360/126 |
| 6,034,852 A | | 3/2000 | Nakano | 360/137 |
| 6,341,052 B2 | * | 1/2002 | Hayashi | 360/324.1 |
| 6,741,430 B2 | * | 5/2004 | Kikuiri | 360/320 |

OTHER PUBLICATIONS

Zieren et al. "High Performance Heads for Perpendicular Recording." IEEE Transactions on Magnetics. vol. 24., No. 6., Nov. 1988. pp. 2597–2602.*

Broese van Groenou, A. "Heads for High–Density Magnetic Tape Recording," IEEE Transactions on Magnetics. 1989. pp. 1–85 to 1–90.*

Bhusan et al. "Development of Hard Carbon Coatings for Thin–Film Heads." IEEE Transactions on Magnetics. vol. 31., No. 6., Nov. 1995. pp. 2976–2978.*

* cited by examiner

*Primary Examiner*—William Korzuch
*Assistant Examiner*—C R Magee
(74) *Attorney, Agent, or Firm*—Brinks Hofer Gilson & Lione (57) ABSTRACT

A magnetic head including an MR head and a write head exposed to a medium-sliding surface. The MR head includes a magnetoresistive element and slides over a magnetic recording medium to read information magnetically recorded in the magnetic recording medium. The MR head further includes a shield layer and a shield core layer which includes a shield section and a core section. A smear-preventing layer is provided between the shield section and the core section in the shield core layer, the smear-preventing layer protruding from the medium-sliding surface farther than at least the core section. The write head includes a gap layer and a thin-film coil section deposited in that order on the shield core layer, and a magnetic core layer deposited over the gap layer and the thin-film coil section so as to be insulated from the thin-film coil section.

16 Claims, 11 Drawing Sheets

THIN-FILM MAGNETIC HEAD PROVIDED WITH SMEAR-PREVENTING LAYER

BACKGROUND OF THE INVENTION

1. Field of the Invention

The present invention relates to magnetic heads.

2. Description of the Related Art

With respect to magnetic heads used in video cassette recorders (VCRs), data storage equipment for computers, etc., as recording density is improved and the signal-recording mode is digitized, track width continues to decrease from year to year.

In view of these circumstances, various metal-in-gap (MIG) type magnetic heads have been used in which two magnetic core halves are bonded together by a bonding agent, such as a welding glass, with an insulating film disposed therebetween. Each magnetic core half comprises a core half formed of a ferrite or a ceramic provided with a metal magnetic film having superior soft magnetic properties.

Moreover, in recent years, for the purpose of further decreasing the track width as compared to the MIG-type magnetic heads, attempts have been made to use magnetic heads which are provided with magnetoresistive elements (MR elements) for reading magnetically recorded information. These magnetic heads have been used in VCRs, data storage equipment, etc.

Figure 9:
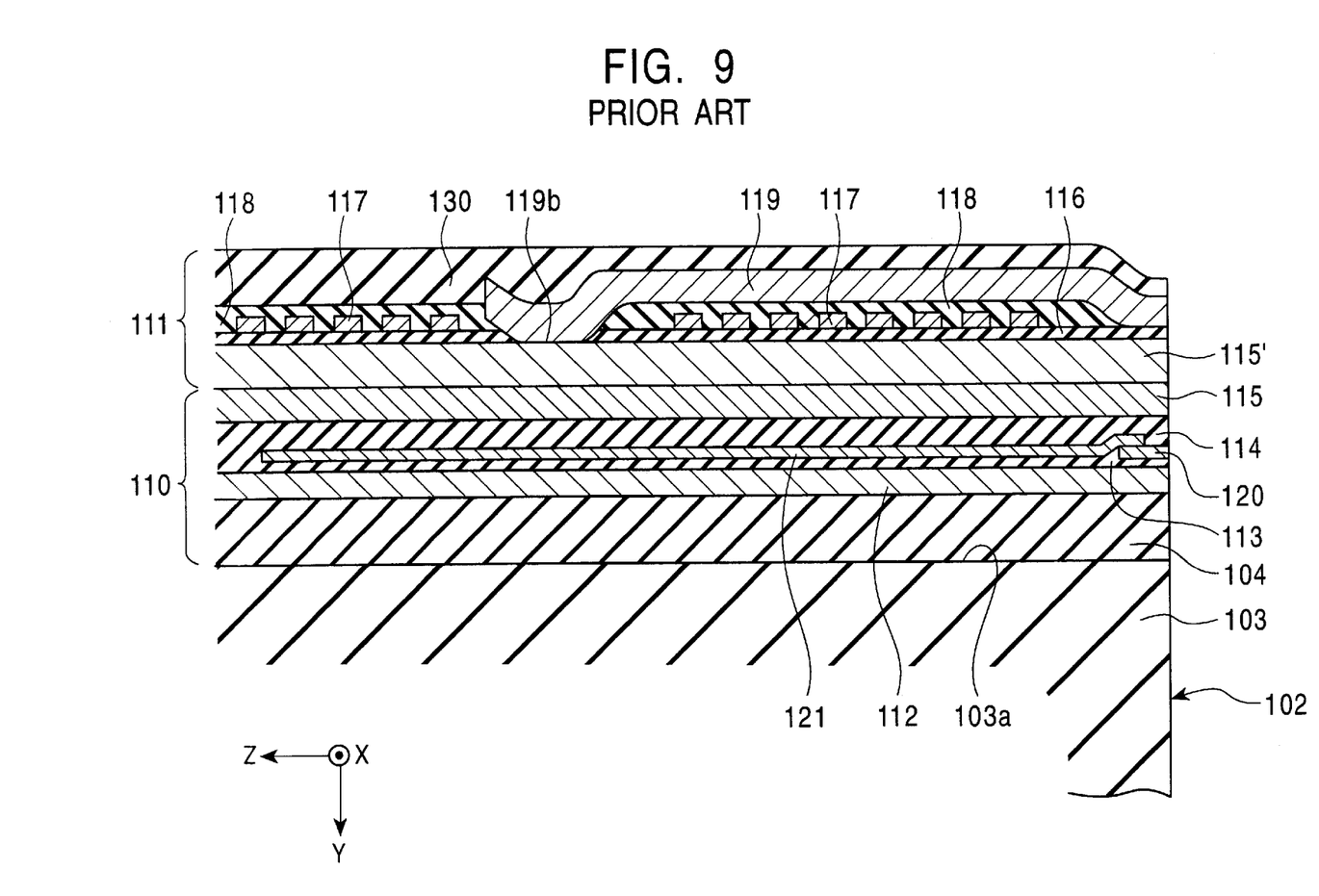
FIG. 9 is a schematic sectional view showing a principal part of a conventional magnetic head.
Figure 10:
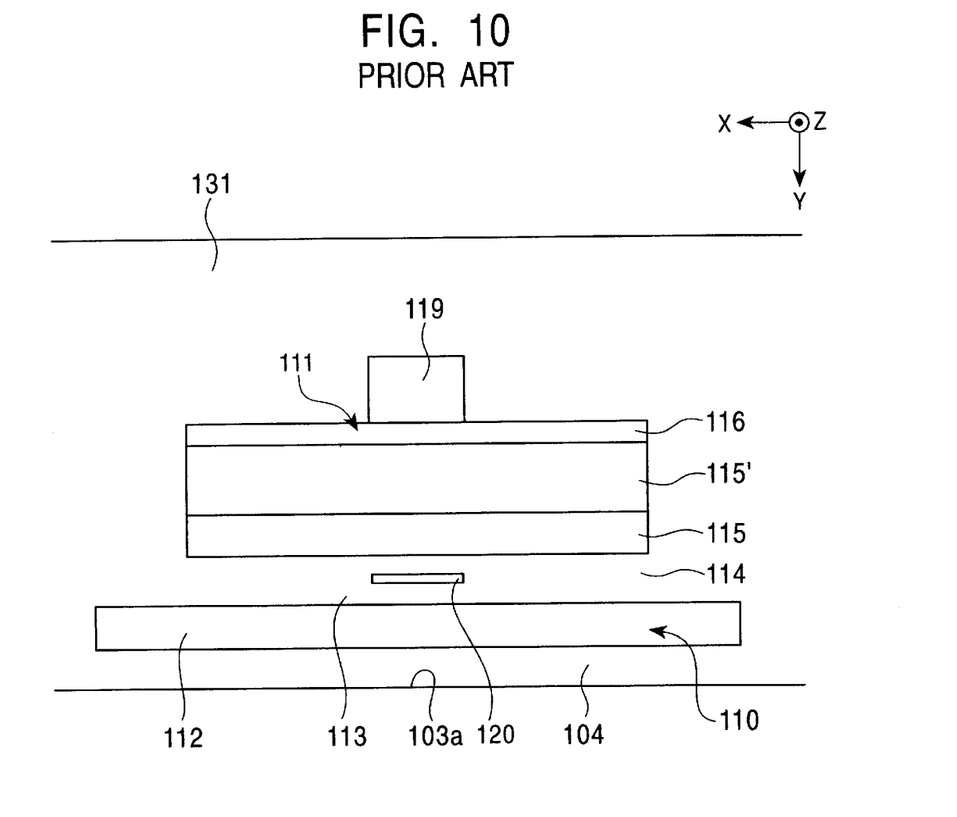
FIG. 10 is an enlarged schematic diagram of a principal part of the magnetic head shown in FIG. 9, viewed from a medium-sliding surface.

FIG. 9 is a sectional view showing a principal part of a conventional magnetic head provided with an MR element, and FIG. 10 is a schematic diagram of a principal part of the magnetic head viewed from a medium-sliding surface.

In FIGS. 9 and 10, the X direction represents the track width direction of the magnetic head, the Y direction represents the travelling direction of a magnetic recording medium as well as the gap length direction of the magnetic head, and the Z direction represents a direction perpendicular to the medium-sliding surface as well as the height direction of the magnetic head. Therefore, the Y direction corresponds to a downstream direction relative to the magnetic recording medium, and a direction opposite to the Y direction corresponds to an upstream direction relative to the magnetic recording medium.

The magnetic head is a so-called "medium-sliding type" magnetic head, and includes two core halves, and an MR head for reading and a write head for recording formed between the core halves.

As shown in FIGS. 9 and 10, an MR head 110 for reading is disposed on an insulating layer 104 formed on an end face 103a of a core half 103, and includes a lower shield layer 112 deposited on the insulating layer 104, a lower insulating layer 113, a magnetoresistive element (hereinafter referred to as an MR element) 120 formed on the lower insulating layer 113 and exposed to a medium-sliding surface 102, an upper insulating layer 114, and an upper shield layer 115.

The MR element 120 comprises a soft magnetic alloy thin film formed of an Ni—Fe alloy or the like, and is connected to an MR electrode 121.

A write head 111 includes a lower core layer 115' deposited on the upper shield layer 115, a gap layer 116 deposited on the lower core layer 115', a thin-film coil section 117, an upper insulating layer 118 covering the thin-film coil section 117, and an upper core layer 119 connected to the gap layer 116. A base 119b of the upper core layer 119 is magnetically coupled to the lower core layer 115' substantially at the center of the thin-film coil section 117.

A core-protection layer 130 composed of alumina or the like is deposited on the upper core layer 119.

As shown in FIG. 10, an insulating sliding-surface layer 131 is provided on both sides in the track width direction (in the X direction) of the MR head 110 and write head 111 and on one side in the gap length direction (the direction opposite to the Y direction) of the write head 111. The insulating sliding-surface layer 131, the MR element 120, the upper and lower shield layers 112 and 115, the upper and lower core layers 115' and 119, and the gap layer 116 constitute the medium-sliding surface 102. The insulating sliding-surface layer 131 is composed of the same material as the insulating layer 104 and the upper and lower insulating layers 113 and 114, and these layers are connected and integrated.

In the MR head 110, when a sensing current supplied from the MR electrode 121 flows through the MR element 120, if a recording magnetic field from the magnetic recording medium is applied to the MR element 120, the resistance of the MR element changes, and thereby the voltage of the sensing current is changed in response to the recording magnetic field. By detecting the change in voltage, magnetically recorded information recorded in the recording medium can be read out.

Although both the upper shield layer 115 and the lower core layer 115' are composed of magnetic materials, the functions of the individual layers differ from each other. Thus, the magnetic properties required are different. That is, the upper shield layer 115 must have a high magnetic permeability because it functions as a magnetic shield for the MR head 110, and the lower core layer 115' must have a high magnetic flux density because it functions as a magnetic pole for the write head 111. Therefore, for example, an Ni-rich Ni—Fe alloy is used for the upper shield layer 115 and an Fe-rich Ni—Fe alloy is used for the lower core layer 115'. Since the Fe-rich Ni—Fe alloy used for the lower core layer 115' has a relatively low hardness and is therefore malleable, a plastic flow can easily occur during grinding.

Figure 11A:
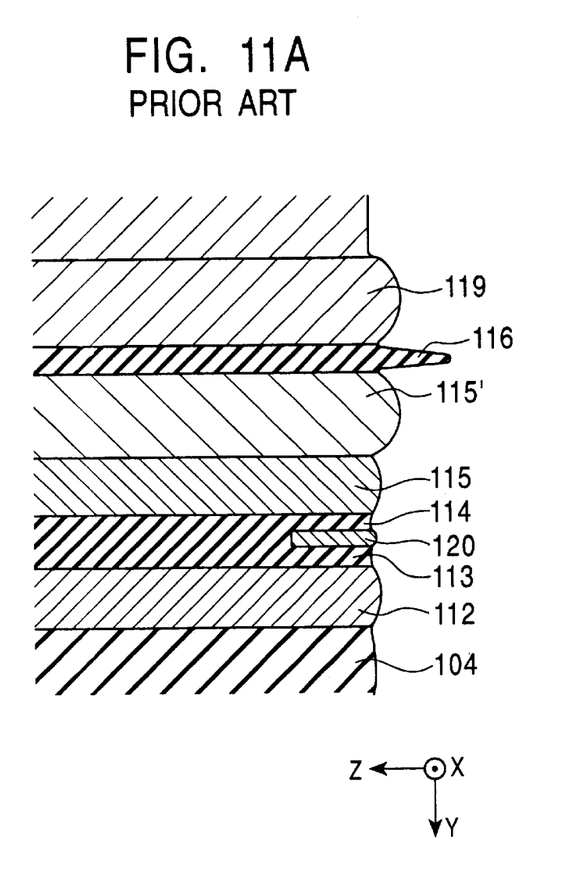
FIGS. 11A and 11B are schematic sectional views showing a principal part of the magnetic head shown in FIG. 9, and showing the state of the medium-sliding surface before and after use, respectively.
Figure 11B:
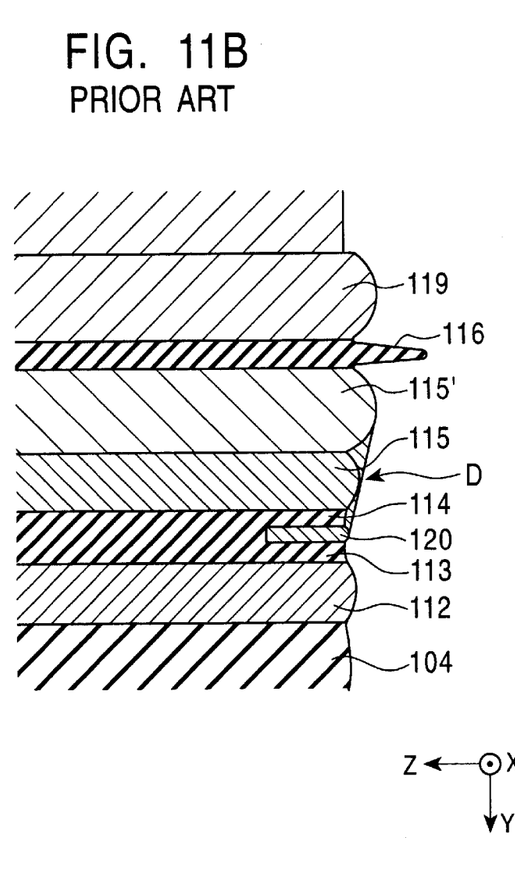

However, in the conventional magnetic head, as shown in FIG. 11, when a magnetic recording medium, such as a magnetic tape, slides over the lower core layer 115', a portion of the lower core layer 115' may be ground and plastic flow may occur, resulting in a lingulate sag D (see the right side in FIG. 11). In some cases, so-called "smearing" may occur in which the lingulate sag D extends to the MR element 120, causing short-circuiting between the lower core layer 115' and the MR element 120, and decreasing the reading output thereby, resulting in the magnetic head having a shortened life span.

Recently, there has also been a demand for decreasing the gap length of the MR head 110 based on the need for an improvement in magnetic recording density. Consequently, the thicknesses of the MR element 120 and the upper and lower insulating layers 114 and 113 have been decreased.

A decrease in the thickness of the upper insulating layer 114 means a decrease in the distance between the MR element 120 and the lower core layer 115', and this often results in smearing.

The problem described above does not relate to so-called "floating-type magnetic recording" in which writing and reading of recorded information are performed while the magnetic head and the magnetic recording medium are moved relative to each other without making contact. However, smearing may be unavoidable when a medium-sliding-type magnetic head is employed.

SUMMARY OF THE INVENTION

It is an object of the present invention to provide a magnetic head in which smearing due to the plastic flow of the lower core layer is prevented so that the magnetic head has a longer life and is suitable for higher recording densities.

In one aspect of the present invention, a magnetic head includes an MR head and a write head which are exposed to a medium-sliding surface, wherein the MR head includes a magnetoresistive element and slides over a magnetic recording medium to read information magnetically recorded in the magnetic recording medium. The MR head further includes a shield layer provided on one side in the thickness direction of the magnetoresistive element, and a shield core layer which includes a shield section and a core section provided on the other side in the thickness direction of the magnetoresistive element, the magnetoresistive element, the shield layer, and the shield section being exposed to the medium-sliding surface. A smear-preventing layer is provided between the shield section and the core section in the shield core layer, the smear-preventing layer protruding from the medium-sliding surface farther than at least the core section. The write head includes a gap layer and a thin-film coil section deposited in that order on the shield core layer. A magnetic core layer, which is magnetically coupled to the core section, is deposited over the gap layer and the thin-film coil section so as to be insulated from the thin-film coil section, with the core section, the gap layer, and the magnetic core layer being exposed to the medium-sliding surface to form a magnetic gap.

In accordance with the magnetic head described above, even if a portion of the core section exposed to the surface facing the medium plastically flows toward the magnetoresistive element (hereinafter referred to as an MR element) due to sliding of the magnetic recording medium, the plastic flow of the core section is blocked by the smear-preventing layer provided between the shield section and the core section, and further because the smear-preventing layer protrudes from the medium-sliding surface farther than the core section. Thus avoiding a short circuit between the MR element and the core section.

In the magnetic head of the present invention, an insulating sliding-surface layer constituting the medium-sliding surface is preferably provided on the periphery of the MR head and the write head, and protrudes from the medium-sliding surface farther than the insulating sliding-surface layer.

In accordance with the magnetic head described above, since the smear-preventing layer protrudes from the medium-sliding surface farther than the insulating sliding-surface layer, the plastic flow of the core section is blocked by the smear-preventing layer, thus avoiding a short circuit between the MR element and the core section.

In the magnetic head of the present invention, the smear-preventing layer is preferably composed of a wear resistant material having a higher wear resistance to the magnetic recording medium than the wear resistance of the insulating sliding-surface layer.

In accordance with the magnetic head described above, since the smear-preventing layer is composed of a wear resistant material that has a superior wear resistance as compared to the insulating sliding-surface layer, even when the insulating sliding-surface layer wears out due to sliding of the magnetic recording medium, the smear-preventing layer does not wear, and therefore protrudes from the medium-sliding surface. Consequently, the plastic flow in the core section is blocked by the smear-preventing layer, and a short circuit between the MR element and the core section is avoided.

In another aspect of the present invention, a magnetic head includes an MR head and a write head which are exposed to a medium-sliding surface. The MR head includes a magnetoresistive element and slides over a magnetic recording medium to read information magnetically recorded in the magnetic recording medium. The MR head further includes a shield layer provided on one side in the thickness direction of the magnetoresistive element, and a shield core layer which includes a shield section and a core section provided on the other side in the thickness direction of the magnetoresistive element, the magnetoresistive element, the shield layer, and the shield section being exposed to the medium-sliding surface. A smear-preventing layer is provided between the shield section and the core section in the shield core layer. The smear-preventing layer has a higher hardness than that of at least the core section, and protrudes from the medium-sliding surface. The write head includes a gap layer and a thin-film coil section deposited in that order on the shield core layer; and a magnetic core layer, which is magnetically coupled to the core section, deposited over the gap layer and the thin-film coil section so as to be insulated from the thin-film coil section, with the core section, the gap layer, and the magnetic core layer being exposed to the medium-sliding surface to form a magnetic gap.

In accordance with the magnetic head described above, even if a portion of the core section exposed to the surface facing the medium plastically flows due to sliding of the magnetic recording medium, the plastic flow in the core section is blocked by the smear-preventing layer since the smear-preventing layer is provided between the shield section and the core section in the shield core layer and does not wear out because of its hardness. Thus, a short circuit between the MR element and the core section can be avoided.

In the magnetic head of the present invention, an insulating sliding-surface layer constituting the medium-sliding surface is preferably provided on the periphery of the MR head and the write head, and the smear-preventing layer is preferably composed of a wear resistant material having higher wear resistance to the magnetic recording medium than the wear resistance of the insulating sliding-surface layer.

Since the smear-preventing layer of the magnetic head described above is composed of a material having higher wear resistance to the magnetic recording medium than the wear resistance of the insulating sliding-surface layer, the smear-preventing layer is not worn even when the insulating sliding-surface layer is worn due to sliding of the magnetic recording medium, and only the smear-preventing layer protrudes from the medium-sliding surface. The plastic flow in the core section is thereby blocked by the smear-preventing layer, thus avoiding a short circuit between the MR element and the core section.

In the magnetic head of the present invention, the smear-preventing layer is preferably composed of $SiO_2$. Since $SiO_2$ is a metal oxide, and since $SiO_2$ lacks affinity for the magnetic alloy constituting the core section, the plastically-flowing portion of the core section does not easily adhere to the smear-preventing layer, and the plastic flow in the core section is more effectively blocked by the smear-preventing layer, thereby avoiding a short circuit between the core section and the MR element. Since $SiO_2$ has superior wear resistance to the recording medium, it is most suitable for a constituent of the smear-preventing layer.

In the magnetic head of the present invention, the insulating sliding-surface layer is preferably composed of $Al_2O_3$. $Al_2O_3$ has superior wear resistance to the magnetic recording medium in comparison with the magnetic materials constituting the MR element, the shield layer, the shield core layer, and the core layer. Therefore, the MR element, the shield layer, the shield core layer, and the core layer are more easily worn than the insulating sliding-surface layer. That is, the medium-sliding surface in the MR head and the write head is minimally worn, resulting in a very small opening between the magnetic recording medium and the medium-sliding surface, and thus writing and reading characteristics of magnetic recording can be improved.

In the magnetic head of the present invention, the shield core layer preferably includes a shield film containing the shield section and a core film containing the core section, and the shield film and the core film are connected with each other in a section in which the smear-preventing layer is not formed.

In the magnetic head of the present invention, the shield core layer preferably includes a shield film containing the shield section and a core film containing the core section, and the shield film and the core film are separated by the smear-preventing layer.

In the magnetic head of the present invention described above, the write head is preferably placed upstream in the sliding direction of the magnetic recording medium and the MR head is placed downstream.

In accordance with the magnetic head described above, since the write head is placed upstream in the sliding direction of the magnetic recording medium, the core section is placed upstream to the smear-preventing layer. Thus, even if the plastic flow in the core section extends toward the MR element, namely, to the downstream portion of the core section, the plastic flow is blocked by the smear-preventing layer, thereby avoiding a short circuit between the MR element and the core section.

Additionally, with respect to a magnetic head system in which a magnetic recording medium slides bidirectionally, when the sliding direction of the magnetic recording medium is directed from the write head to the MR head, the plastic flow in the core section is blocked by the smear-preventing layer in a manner similar to that described above.

When the sliding direction of the magnetic recording medium is directed from the MR head to the write head, a short circuit does not occur between the MR element and the core section since the plastic flow in the core section does not extend to the MR head.

DESCRIPTION OF THE PREFERRED EMBODIMENTS

The embodiments of the present invention will be described with reference to the drawings. However, it is to be understood that the present invention is not limited to the embodiments described below.

FIGS. 1 to 4 show a magnetic head in an embodiment of the present invention. In FIGS. 1 to 4, the X direction represents the track width direction of the magnetic head, the Y direction represents the travelling direction of a magnetic recording medium as well as the gap length direction of the magnetic head, and the Z direction represents a direction perpendicular to the medium-sliding surface as well as the height direction of the magnetic head. Therefore, the Y direction corresponds to a downstream direction relative to the magnetic recording medium, and a direction opposite to the Y direction corresponds to an upstream direction relative to the magnetic recording medium.

Figure 1:
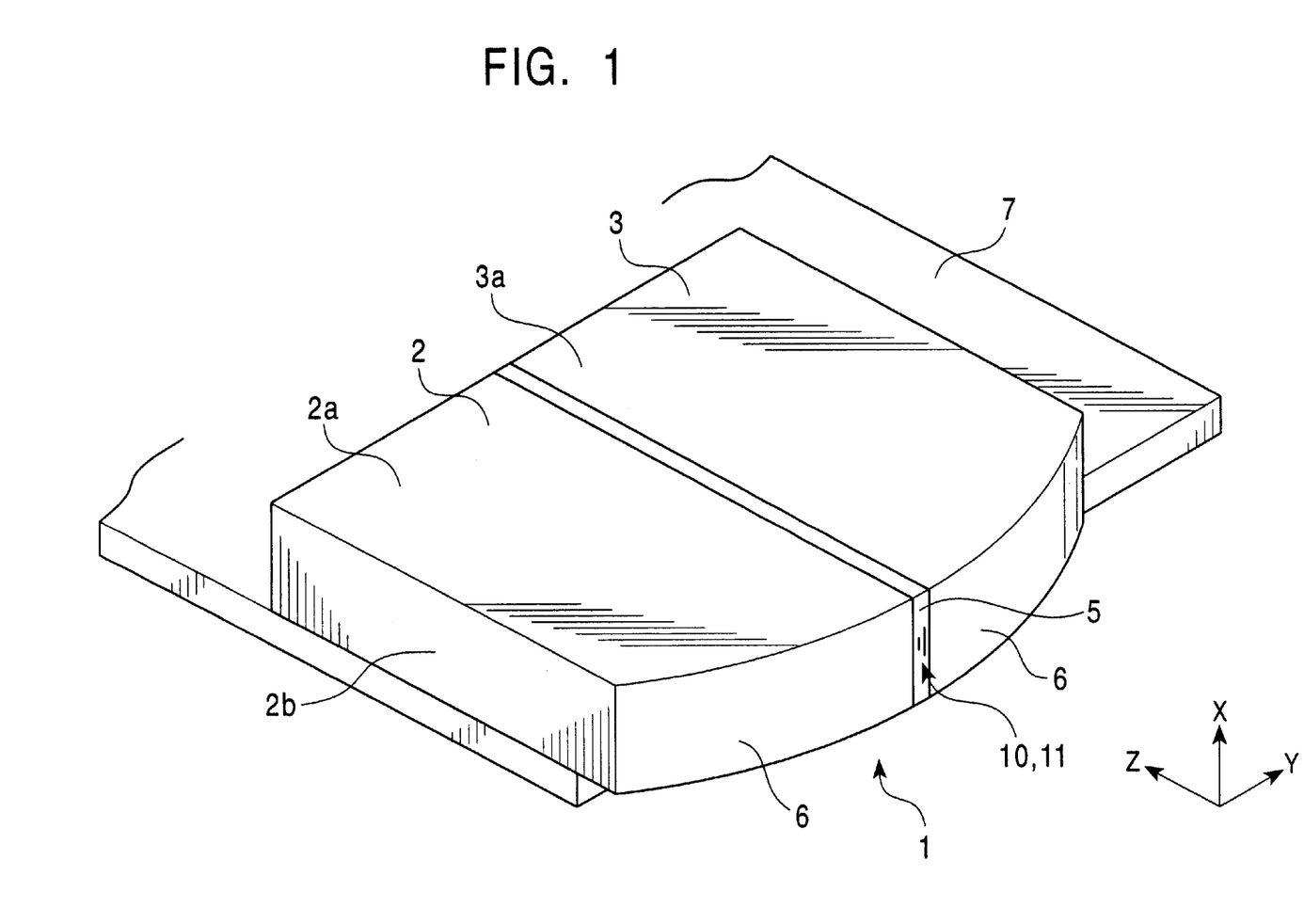
FIG. 1 is a perspective view showing a magnetic head in an embodiment of the present invention.

FIG. 1 shows the state in which a magnetic head 1 of the present invention is mounted on a base plate 7 of a rotating cylinder of a magnetic recording apparatus, such as a VCR.

In the magnetic head 1, the end faces of plate core halves 2 and 3 are bonded together with a core-embedded layer 5 therebetween to form the entire head in a plate shape. One of the lateral faces having large areas in each of the core halves 2 and 3 (in FIG. 1, the lower surface of each of the core halves 2 and 3) is bonded to the upper surface of the base plate 7, and the magnetic head 1 is fixed on the base plate 7 so that one side of each of the core halves 2 and 3 slightly protrudes from the edge of the base plate 7.

The core halves 2 and 3 are composed of a ceramic material, such as $CaTiO_3$ or $Al_2O_3$+TiC, or a ferrite, which has superior wear resistance.

One side of the magnetic head 1, which protrudes from the base plate 7, is formed into a medium-sliding surface 6 having a slender convex shape. The medium-sliding surface 6 is a curved surface formed along the lateral faces of the core halves 2a and 3a.

Figure 2:
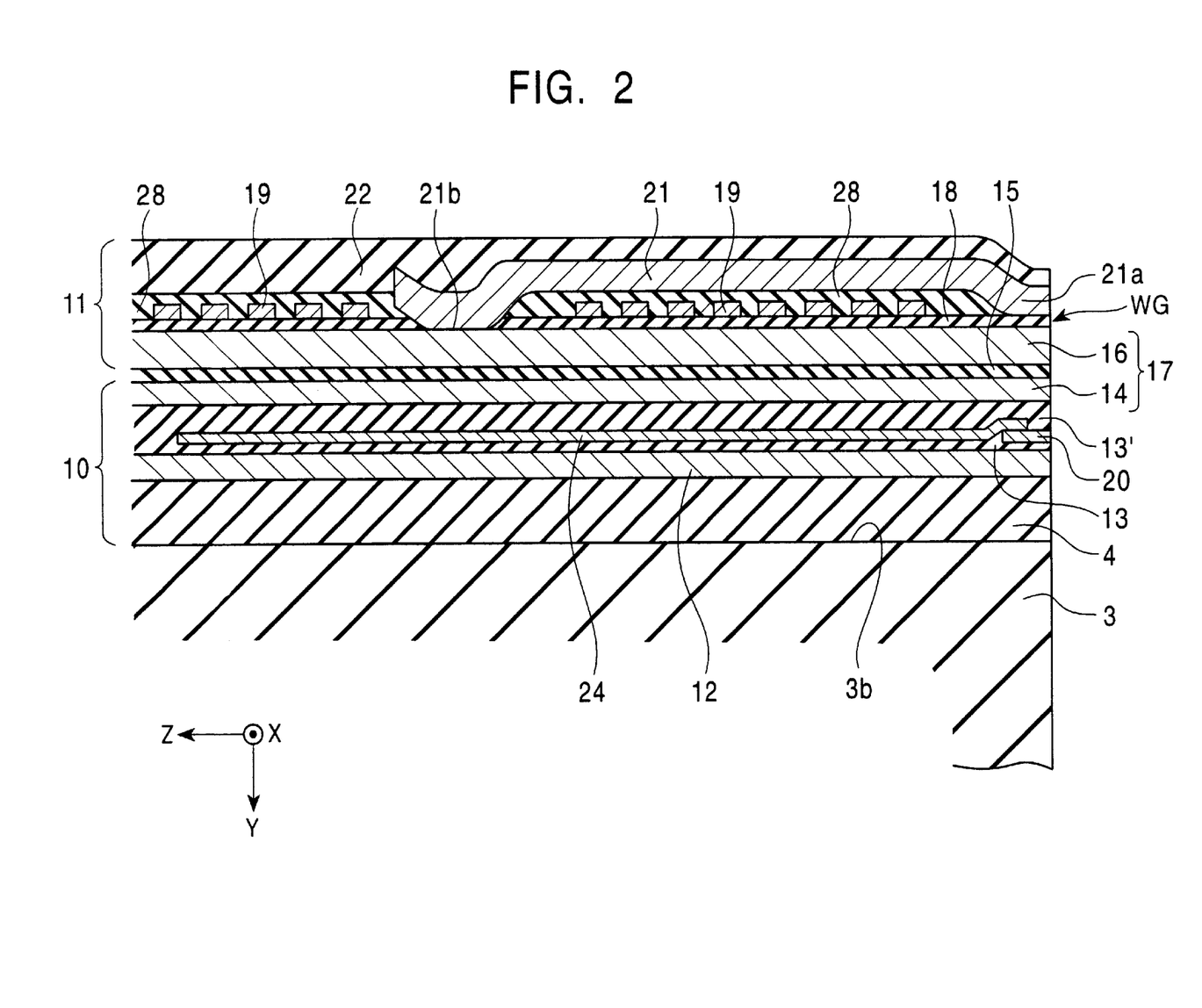
FIG. 2 is a schematic sectional view of the principal part of the magnetic head shown in FIG. 1.
Figure 3:
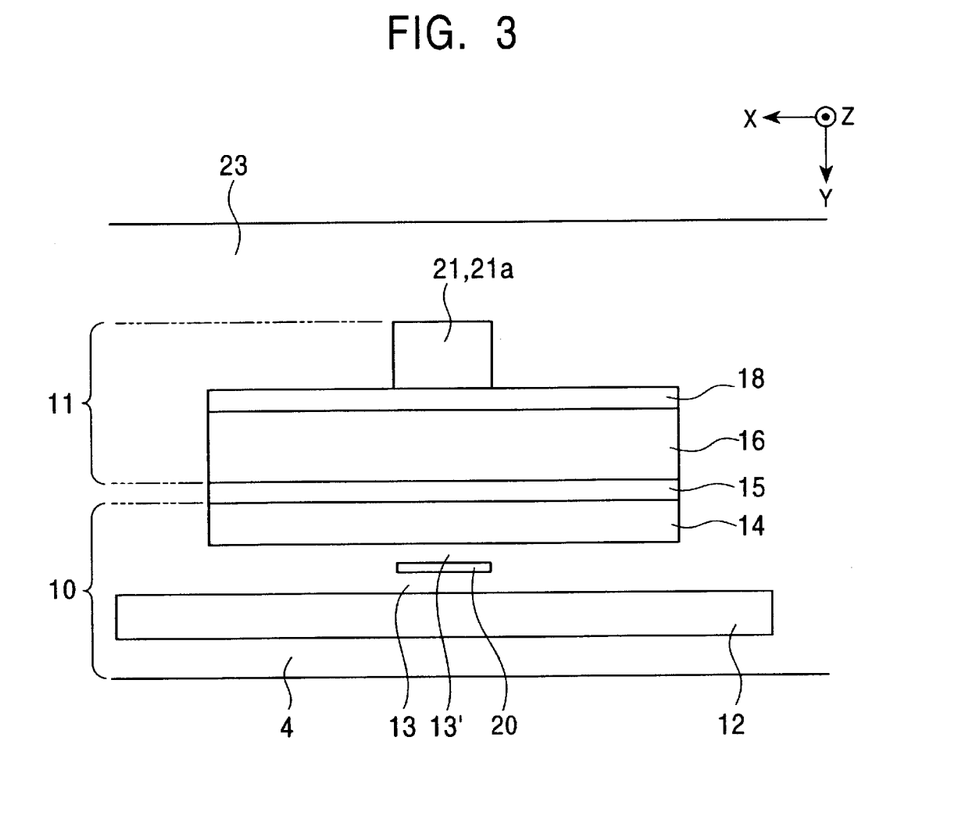
FIG. 3 is an enlarged schematic diagram showing the principal part of the magnetic head shown in FIG. 1, viewed from a medium-sliding surface.

The core-embedded layer 5 contains a write head 11 and an MR head 10, which have a structure as shown, for example, in FIGS. 2 and 3.

As shown in FIG. 2, the write head 11 is placed on the side of the MR head 10 in a direction opposite to the Y direction, and the MR head 10 is placed on the side of the write head 11 in the Y direction. That is, the write head 11 is placed upstream in the sliding direction of the magnetic recording medium and the MR head 10 is placed downstream.

As shown in detail in FIGS. 2 and 3, the MR head 10 is disposed on an insulating layer 4 composed of $Al_2O_3$ formed on an end face 3b of the half core 3. A lower shield layer (shield layer) 12 composed of a magnetic material, such as an Ni—Fe alloy, an Fe—Al—Si alloy, or a Co amorphous alloy, is deposited on the insulating layer 4. A gap layer 13, composed of a nonmagnetic material such as alumina ($Al_2O_3$), is formed on the lower shield layer 12, and a magnetoresistive element (hereinafter referred to as MR element) 20 is embedded in the gap layer 13. A gap layer 13' composed of $Al_2O_3$ or the like, and an upper shield film (shield section) 14 composed of a magnetic material, such as an Ni—Fe alloy, are formed thereon.

The lower shield layer 12, the MR element 20, and the upper shield film 14 are exposed to the medium-sliding surface 6.

The MR element 20 is composed of a magnetic material exhibiting a magnetoresistance effect, and an electrode layer 24 for applying a sensing current to the MR element 20 is connected thereto.

A smear-preventing layer 15 with a thickness of 500 to 1,500 nm is deposited on the upper shield film 14, and a lower core film (core section) 16 is deposited on the smear-preventing layer 15. The upper shield film 14 and the lower core film 16 constitute a shield core layer 17. That is, the shield core layer 17 comprises the upper shield film 14 and the lower core film 16 divided by the smear-preventing layer 15.

If the thickness of the smear-preventing layer 15 is less than 500 nm, the plastic flow of the lower core film 16 cannot be effectively blocked, and if the thickness exceeds 1,500 nm, the total height of the MR head 10 and the write head 11 becomes excessively large.

Preferably, the smear-preventing layer 15 has a higher hardness than at least the lower core film 16.

In the write head 11, a write gap layer 18, composed of a nonmagnetic material such as $SiO_2$, is formed on the lower core film 16, and a thin-film coil section 19, which is annularly, spirally shaped, is formed thereon, the thin-film coil section 19 being surrounded by an insulating material layer 28. An upper core layer (magnetic core layer) 21 is formed on the insulating material layer 28. A pole tip 21a of the upper core layer 21 is exposed to the medium-sliding surface 6, and is opposed to the lower core film 16 with a minute gap therebetween. A base 21b of the upper core layer 21 is magnetically coupled to the lower core film 16. The pole tip 21a of the upper core layer 21 is positioned at the medium-sliding surface 6 side, and a magnetic gap WG for writing is formed between the pole tip 21a and the tip of the lower core film 16 at the medium-sliding surface 6 side. A protective layer 22 composed of alumina or the like is provided on the upper core layer 21.

As shown in FIG. 3, an insulating sliding-surface layer 23 is provided on both sides in the track width direction (in the X direction) of the MR head 10 and the write head 11 as well as on one side in the gap length direction (in a direction opposite to the Y direction) of the write head 11.

The insulating sliding-surface layer 23, together with the MR element 20, the upper shield film 14, the lower shield layer 12, the smear-preventing layer 15, the lower core film 16, the upper core layer 21, and the write gap layer 18, constitutes the medium-sliding surface 6. The insulating sliding-surface layer 23 is composed of the same material as the insulating layer 4, and is connected and integrated with the insulating layer 4.

Preferably, the smear-preventing layer 15 has superior wear resistance to a magnetic recording medium as compared to the insulating sliding-surface layer 23.

In the write head 11, a recording current is applied to the thin-film coil section 19, and a magnetomotive force is applied to a magnetic circuit comprising the thin-film coil section 19, the upper core layer 21, and the lower core film 16. Magnetic signals are written into a magnetic recording medium, such as a magnetic tape, by a fringing magnetic field between the lower core film 16 and the pole tip 21a of the upper core layer 21 at the magnetic gap WG.

In the MR head 10, when a fringing magnetic field from a magnetic recording medium, such as a magnetic tape, is applied to the MR element 20 in the presence of a sensing current from the electrode layer 24, a change in resistance occurs. Since the electrical resistance of the MR element 20 changes depending on whether the fringing magnetic field from the magnetic tape is present or not, by detecting the resistance change, magnetically recorded information in the magnetic tape or the like can be read out.

Since the lower shielding layer 12 and the upper shielding film 14 act as magnetic shields of the MR head 10, they are preferably composed of a material having a high magnetic permeability, for example, an Ni—Fe alloy with an Fe content of approximately 20% by weight.

Since the upper core layer 21 and the lower core film 16 act as magnetic poles of the write head 11, they are preferably composed of a material having a high magnetic flux density, for example, an Ni—Fe alloy with an Fe content of approximately 55% by weight.

Preferably, the smear-preventing layer 15 is composed of a material which has a higher hardness than the lower core film (core section) 16, and is also composed of a wear resistant material having higher wear resistance to the magnetic recording medium than the insulating sliding-surface layer 23. Examples of such a wear resistant material include $SiO_2$.

As described above, both the smear-preventing layer 15 and the write gap layer 18 are composed of $SiO_2$, which has superior wear resistance as compared to the $Al_2O_3$ which constitutes the insulating sliding-surface layer 23 and the magnetic materials, such as Ni—Fe alloys, which constitute the lower shield layer 12, the upper shield film 14, the lower core film 16, and the upper core film 21.

The smear-preventing layer 15 has a higher hardness than the lower shield layer 12, the upper shield film 14, the lower core film 16, and the upper core layer 21, which are each composed of magnetic materials such as Ni—Fe alloys.

Therefore, when the medium-sliding surface 6 is formed in the fabrication process by grinding of the magnetic head, the smear-preventing layer 15 and the write gap layer 18 are more resistant to grinding than the insulating sliding-surface layer 23, the lower shield layer 12, the upper shield film 14, the lower core film 16, and the upper core layer 21. When the grinding process is completed, the smear-preventing layer 15 and the write gap layer 18 protrude outwardly from the medium-sliding surface 6 as shown in FIG. 4.

Figure 4:
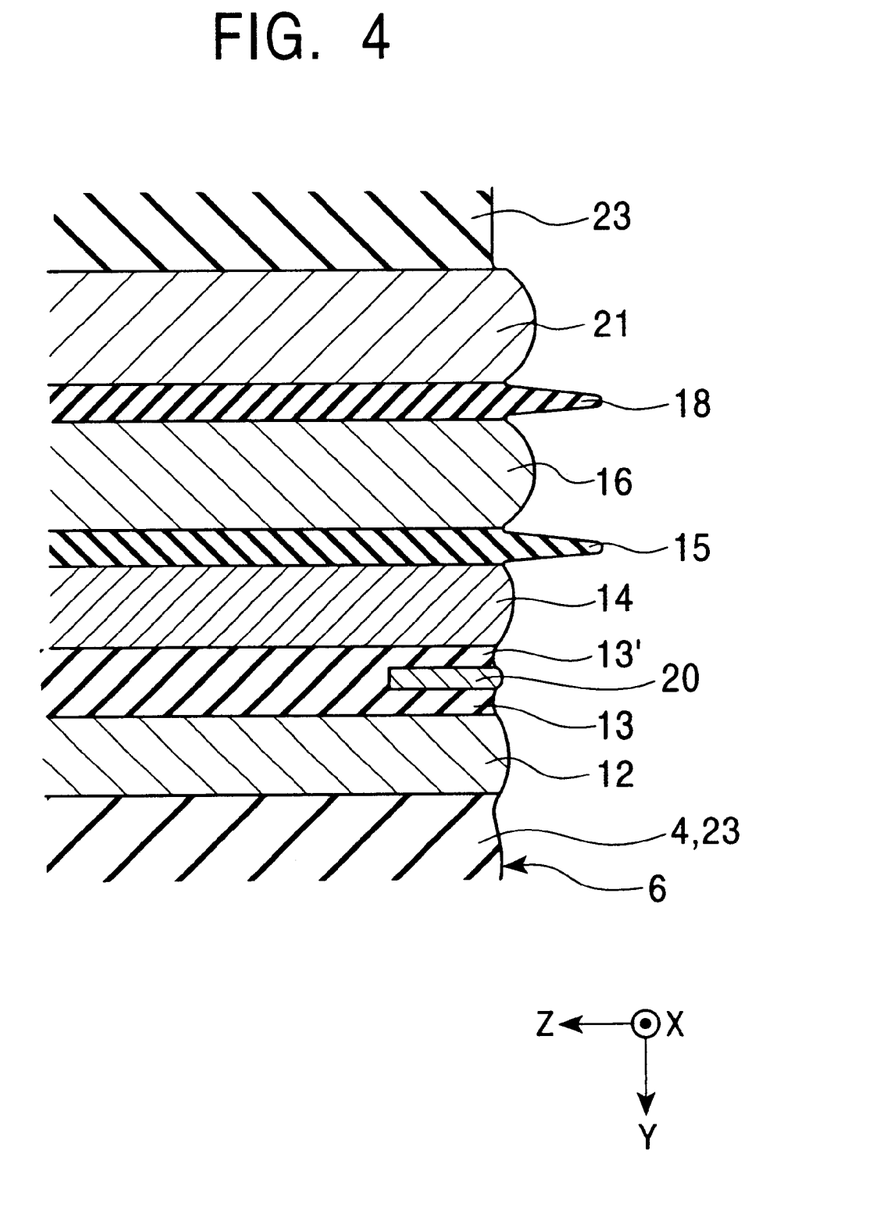
FIG. 4 is a schematic sectional view of a principal part of the magnetic head shown in FIG. 1.

FIG. 4 is an enlarged sectional view showing the medium-sliding surface 6 in the vicinity of the MR head 10 and the write head 11. As shown in FIG. 4, the smear-preventing layer 15 protrudes from the insulating sliding-surface layer 23 (insulating layer 4), the lower shield layer 12, the upper shield film 14, the lower core film 16, and the upper core layer 21, in a direction opposite to the Z direction. The protrusion of the smear-preventing layer 15 has an approximate height of several nanometers.

As shown in FIG. 4, the write gap layer 18 also protrudes from the medium-sliding surface 6 in a direction opposite to the Z direction in a manner similar to that of the smear-preventing layer 15.

In addition to the fabrication process, the medium-sliding surface 6 is also worn by the sliding of a magnetic recording medium. Since the abrasion due to the magnetic recording medium proceeds slower than the abrasion due to grinding during the fabrication of the medium-sliding surface, plastic flow of the lower core film 16 can easily occur. If the lower core film 16 plastically flows due to the sliding of the magnetic recording medium, the plastic flow extends to the downstream side in the sliding direction of the magnetic recording medium, namely, to the MR element 20.

In particular, since the lower core film 16 is composed of an Ni—Fe alloy with an Fe content of approximately 55% by weight, the lower core film 16 has higher malleability than the upper shield film 14 and plastic flow can easily occur.

In the magnetic head of the present invention, since the smear-preventing layer 15 protrudes from the medium-sliding surface 6 from between the lower core film 16 and the upper shield film 14, even if a portion of the lower core film 16 plastically flows, the flow is blocked by the smear-preventing layer 15, thereby preventing the portion of the lower core film 16 from extending to the MR element 20.

Consequently, short-circuiting of the lower core film 16 and the MR element 20 is prevented, and a sensing current is prevented from shunting from the MR element 20 to the write head 11. Thus, the rate of resistance change of the MR element 20 is kept high, and a high reading output of the MR head 10 can be maintained.

The smear-preventing layer 15 is preferably composed of a metal oxide such as $SiO_2$ which is a metal oxide. Since $SiO_2$ lacks affinity for the Ni—Fe alloy constituting the lower core film 16, any plastically-flowing portion of the lower core film 16 does not generally adhere to the smear-preventing layer 15, and the plastic flow of the lower core film 16 is more effectively blocked by the smear-preventing layer 15, thereby avoiding a short circuit between the lower core film 16 and the MR element 20.

When the medium-sliding surface 6 is ground, and when the magnetic recording medium slides over the medium-sliding surface 6, the insulating sliding-surface layer 23 provided on the periphery of the MR head 10 and the write head 11 is typically worn. The insulating sliding-surface layer 23 is composed of $Al_2O_3$, which has an inferior wear resistance as compared to the smear-preventing layer 15 composed of $SiO_2$. Therefore, the smear-preventing layer 15 protrudes farther than the insulating sliding-surface layer 23.

Thus, even if a portion of the lower core film 16 plastically flows, the flow is blocked by the smear-preventing layer 15, and the portion of the lower core film 16 does not extend to the MR element 20. Consequently, the lower core film 16 and the MR element 20 are not short-circuited, the rate of resistance change of the MR element 20 is kept high, and a high reading output of the MR head 10 can be maintained.

The $Al_2O_3$ constituting the insulating sliding-surface layer 23 has a superior wear resistance to the magnetic recording medium as compared to the magnetic materials constituting the MR element 20, the lower shield layer 12, the shield core layer 17, and the upper core layer 21. Consequently, the MR element 20, the lower shield layer 12, the shield core layer 17, and the upper core layer 21 are more easily worn than the insulating sliding-surface layer 23. That is, as the medium-sliding surface 6 in the MR head 10 and the write head 11 becomes slightly worn, a very minute opening is created between the magnetic recording medium and the medium-sliding surface 6. Thus, writing and reading characteristics of magnetic recording can be improved.

Figure 5:
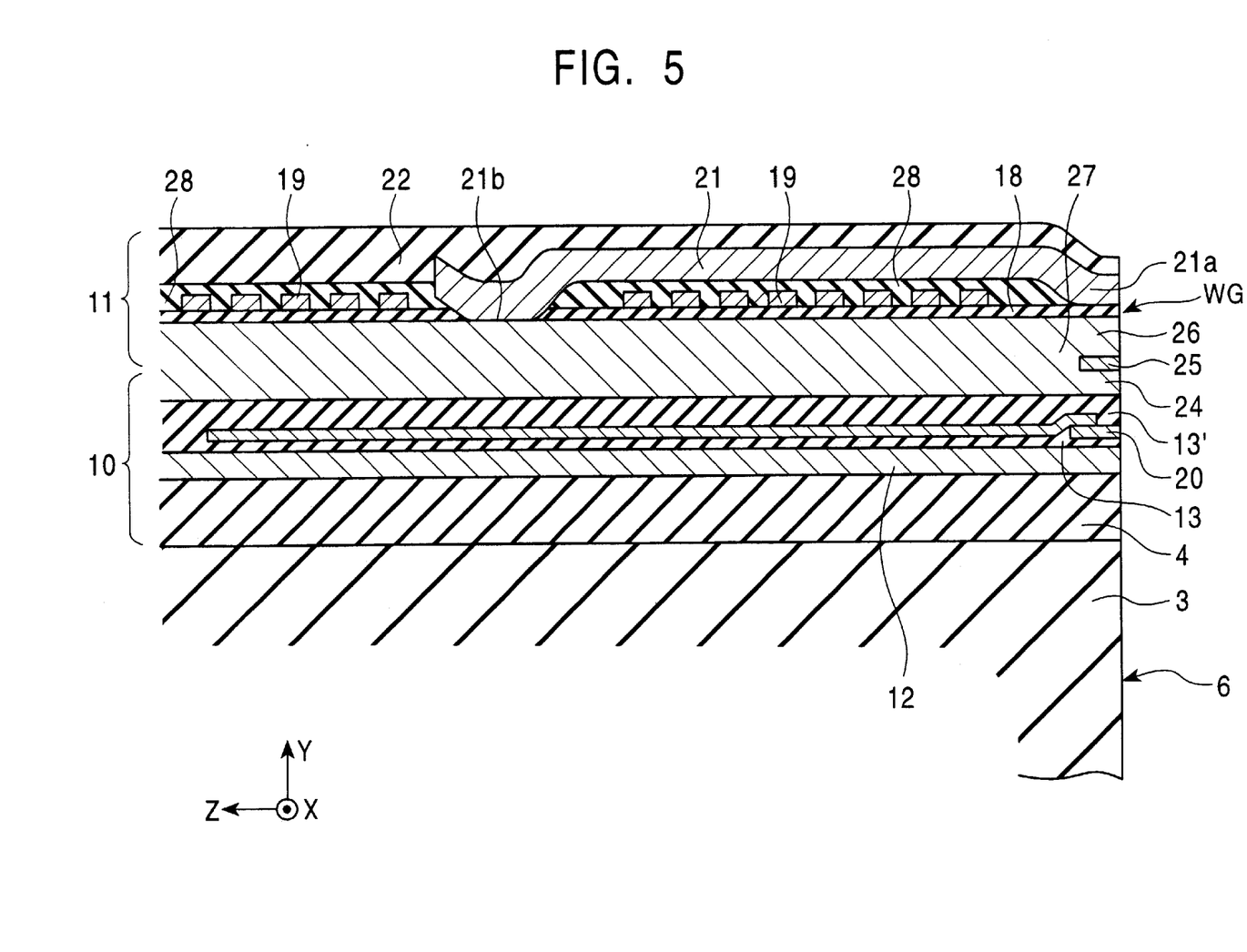
FIG. 5 is a schematic sectional view showing a principal part of a magnetic head in another embodiment of the present invention.

Additionally, although in the embodiment described above, the shield core layer 17 is divided into the upper shield film 14 and the lower core film 16 by the smear-preventing layer 15, the present invention is not limited thereto. For example, a structure shown in FIG. 5 may be employed. FIG. 5 is a sectional view of a principal part of a magnetic head in another embodiment of the present invention.

In the vicinity of a medium-sliding surface 6 of the magnetic head in this embodiment, a lower shield film 24 (shield film), a smear-preventing layer 25, and an upper core film 26 (core section) are deposited on a gap layer 13' constituting an MR head 10. The smear-preventing layer 25 extends for a predetermined length from the medium-sliding surface 6 in the Z direction.

The lower shield film 24 and the upper core film 26 are joined to each other in the region in which the smear-preventing layer 25 is not formed (i.e., in the region lying in the Z direction), so as to form a shield core layer 27. In such a case, the lower shield film 24 and the upper core film 26 may be composed of the same material or composed of different materials.

The present invention will be described in more detail based on the examples.

EXAMPLE 1

An insulating layer composed of $Al_2O_3$, a lower shield layer composed of an Ni—Fe alloy, a lower gap layer composed of $Al_2O_3$, an MR element, an upper gap layer composed of $Al_2O_3$, and an upper shield layer composed of an Ni-rich Ni—Fe alloy were deposited in that order on a core half composed of an $Al_2O_3$—TiC ceramic to form an MR head as shown in FIG. 2.

Next, a smear-preventing layer composed of $SiO_2$ and a lower core film composed of an Fe-rich Ni—Fe alloy were deposited on the upper shield film of the MR head.

A write gap layer, a thin-film coil section, and an upper core layer composed of an NiFe alloy were then deposited in that order on the lower core film to form a write head.

An insulating sliding-surface layer composed of $Al_2O_3$ was deposited on the periphery of the MR head and the write head to form a core-embedded layer, and another core half was bonded thereto to form a core block.

Lastly, one side of the core block was ground so that the MR element, the lower shield layer, the tip of the upper core layer, etc., are exposed to the medium-sliding surface, thereby fabricating a magnetic head as shown in FIGS. 1 to 4.

Additionally, in the fabrication process of the magnetic head, metal oxide layers constituting the gap layer, the smear-preventing layer, the write gap layer, insulating sliding-surface layer, etc., were formed by sputtering. The magnetic material layers constituting the lower shield layer, the upper shield film, the lower core film, etc., were formed by plating.

COMPARATIVE EXAMPLE 1

As Comparative Example 1, a magnetic head as shown in FIGS. 9 and 10 was fabricated in the same manner as that of the magnetic head in Example 1, apart from the fact that the smear-preventing layer was not deposited or otherwise formed.

COMPARATIVE EXAMPLE 2

As Comparative Example 2, a magnetic head was fabricated in the same manner as that of the magnetic head in Example 1, apart from the fact that $Al_2O_3$ was used as the material for the smear-preventing layer.

With respect to the magnetic heads of Example 1 and Comparative Example 2, a sliding test was performed in which a magnetic tape was made to slide over each magnetic head. Magnetically recorded information of the magnetic tape was continuously read by each magnetic head, and the rate of DC resistance change over sliding time was measured. The results thereof are shown in FIGS. 6 and 7, respectively.

Figure 8:
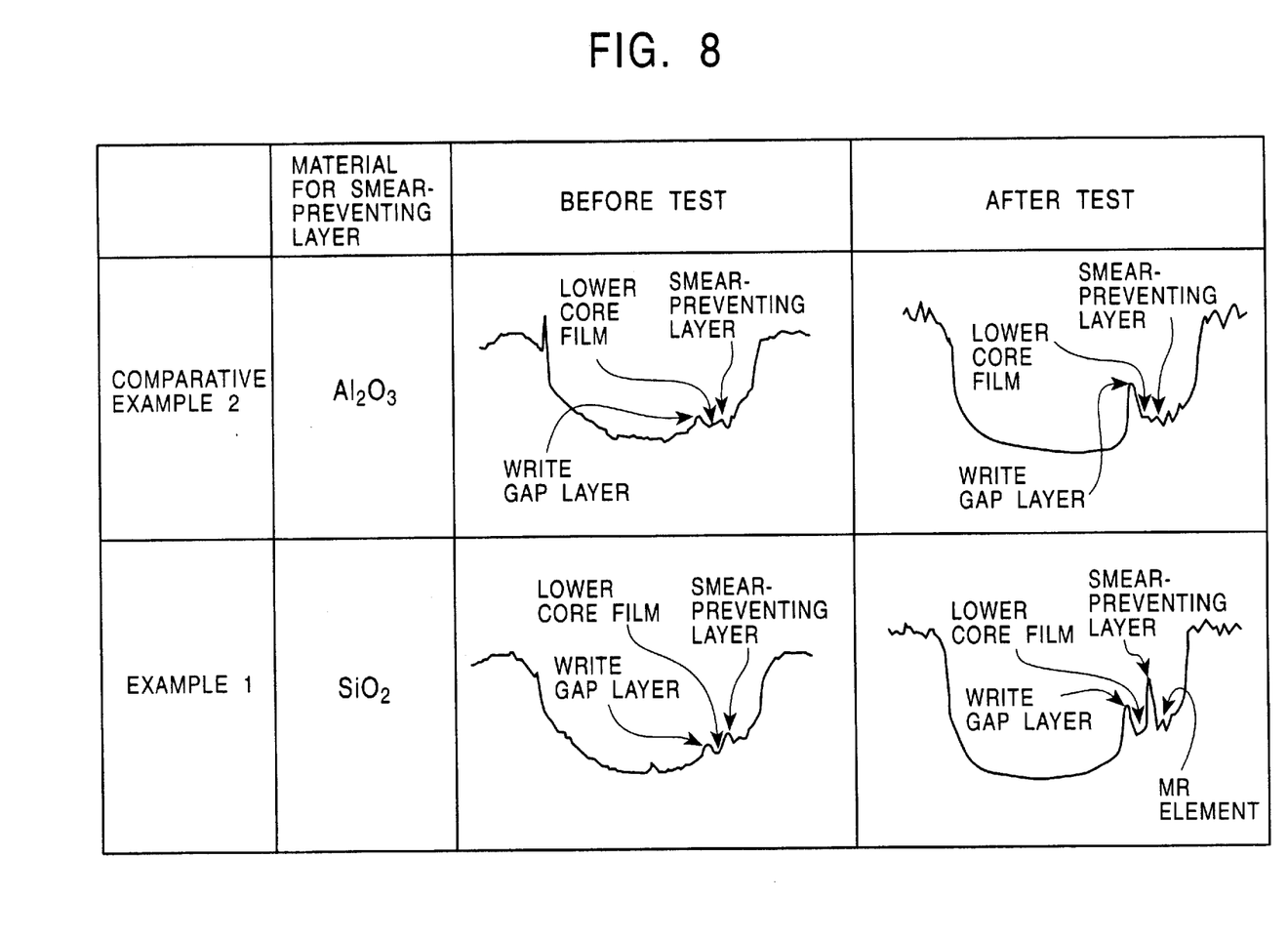
FIG. 8 is a diagram showing the results of analysis of magnetic heads in Example 1 and Comparative Example 2 using an atomic force microscope, and illustrating the states of the medium-sliding surfaces of the individual magnetic heads.

With respect to the magnetic heads of Example 1 and Comparative Example 2, the concave and convex state of the medium-sliding surface in the MR head and the write head, before and after a magnetic tape was slid for 100 hours, was observed by an atomic force microscope. The results thereof are shown in FIG. 8.

Figure 6:
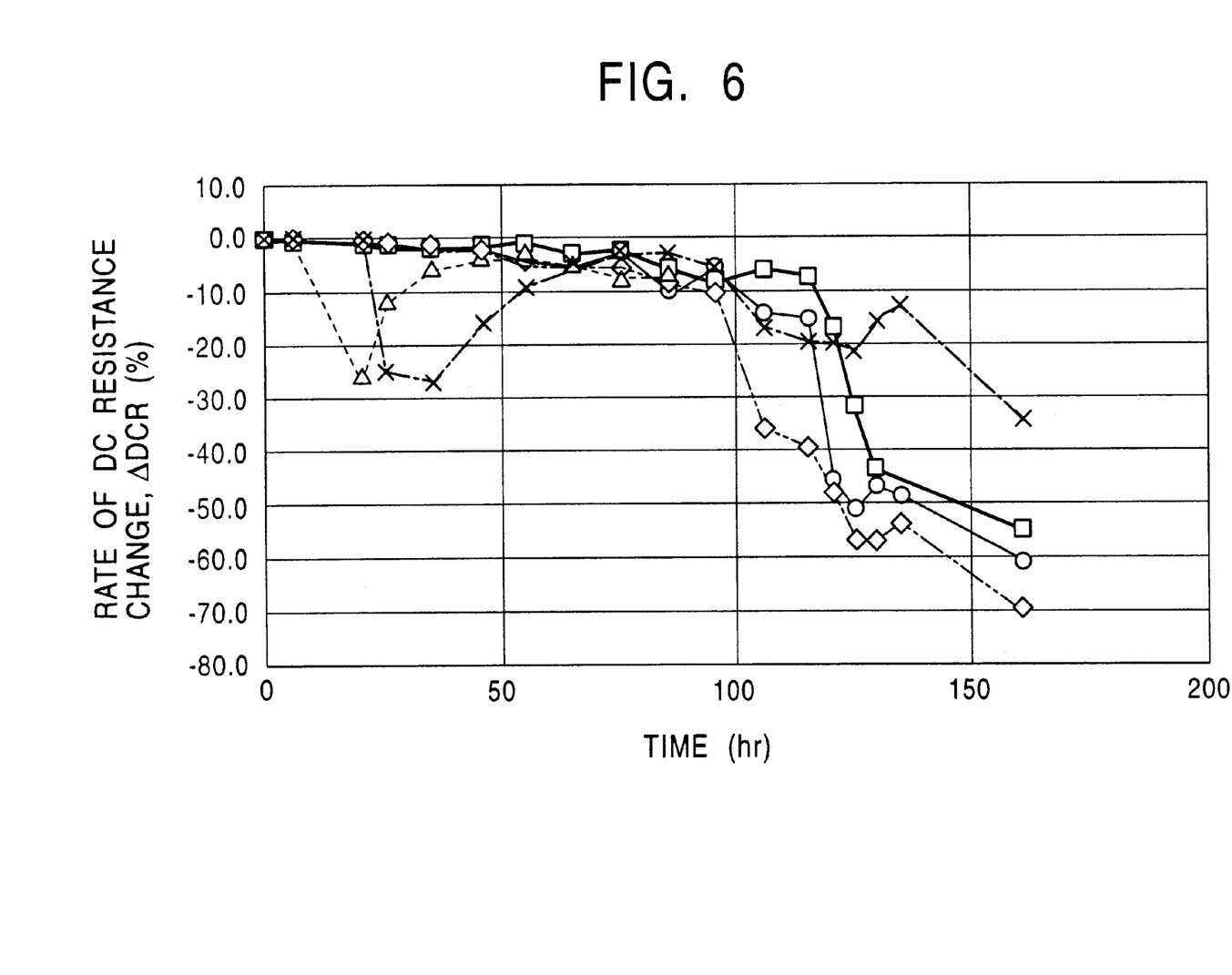
FIG. 6 is a graph showing the relationship between the sliding time of a magnetic head in Comparative Example 1 and the rate of DC resistance change.
Figure 7:
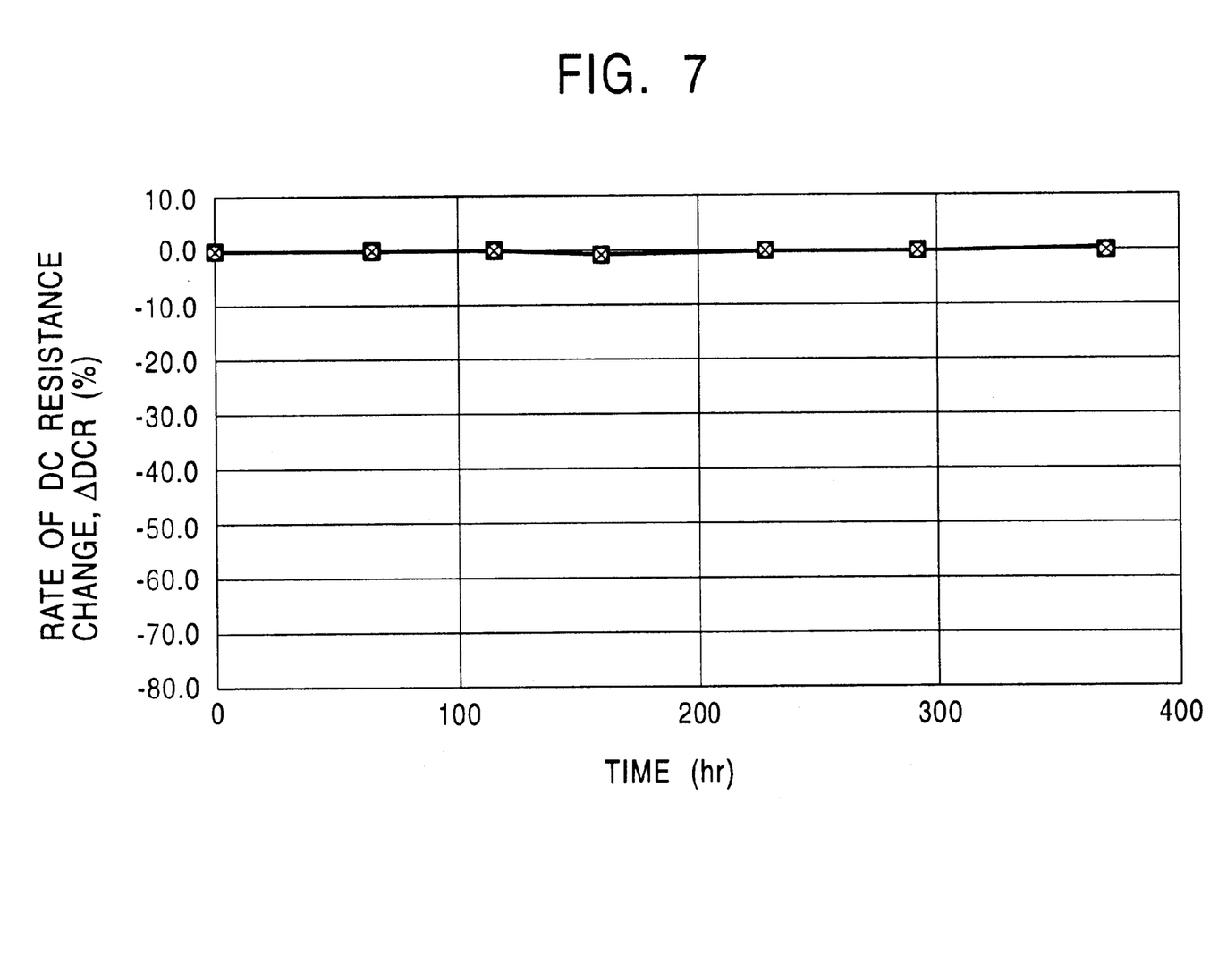
FIG. 7 is a graph showing the relationship between the sliding time of a magnetic head in Example 1 and the rate of DC resistance change.

FIG. 6 shows the dependence of the rate of DC resistance change on the sliding time in Comparative Example 1. As is obvious from FIG. 6, among the magnetic heads which were not provided with smear-preventing layers (indicated by A), the magnetic heads exhibited a variation in the rate of DC resistance change as early as approximately 10 hours from the start. With respect to the magnetic head indicated by Δ, the rate of DC resistance change later recovered to approximately 0%. It is believed that this is because the portion of the lower core film which had plastically flowed had been lost due to abrasion as the wear of the medium-sliding surface further advanced.

In any event, in all of the magnetic heads of Comparative Example 1, the rate of DC resistance change greatly decreased after approximately 100 hours, and thus it was verified that smearing due to plastic flow of the lower core films had advanced.

FIG. 7 shows the dependence of the rate of DC resistance change on the sliding time in Example 1. As shown in FIG. 7, in the magnetic heads provided with smear-preventing layers composed of $SiO_2$, a variation in the rate of DC resistance change was not observed at all even after approximately 300 hours. Thus, it was verified that short circuits between the lower core films and the MR elements were effectively prevented by the smear-preventing layers.

FIG. 8 shows the analysis results of the medium-sliding surfaces of the magnetic heads in Example 1 and Comparative Example 2, using an atomic force microscope. In particular, FIG. 8 shows the states of the medium-sliding surfaces of the magnetic heads in Example 1 and Comparative Example 2, viewed from the cross sections in the track width direction. That is, FIG. 8 corresponds to FIG. 4 or 11.

As shown in FIG. 8, before the sliding test, either in Example 1 or in Comparative Example 2, the write gap layer and the smear-preventing layer protrude only slightly.

After the test (after 100 hours), in Comparative Example 2, only the write gap layer composed of $SiO_2$ protrudes, and the protrusion height of the smear-preventing layer composed of $Al_2O_3$ does not substantially change from that before the testing.

In contrast, in Example 1, in addition to the write gap layer, the smear-preventing layer composed of $SiO_2$ also protrudes, and the protrusion height of the smear-preventing layer is significantly larger than that of the lower core film. Thus, it has been verified that the plastic flow of the lower core film can be effectively prevented.

It is believed that the rates of DC resistance change of magnetic heads in Example 1 did not vary at all in FIG. 7 because the smear-preventing layer protruded farther than the lower core film, and the plastic flow of the lower core film was blocked by the smear-preventing layer.

As described above, there was a difference in the states of the medium-sliding surfaces depending on the materials for the smear-preventing layers. It is believed that this is due to $SiO_2$ having superior wear resistance to the magnetic recording medium as compared to $Al_2O_3$. Thus, the abrasion loss of the smear-preventing layer in Example 1 is smaller than the abrasion loss of the smear-preventing layer in Comparative Example 2.

What is claimed is:

1. A magnetic head comprising an MR head and a write head which are exposed to a medium-sliding surface, the MR head comprising a magnetoresistive element and sliding over a magnetic recording medium to read information magnetically recorded in the magnetic recording medium, the MR head further comprising:
a shield layer provided on one side in the thickness direction of the magnetoresistive element; and
a shield core layer comprising a shield section and a core section provided on the other side in the thickness direction of the magnetoresistive element, the magnetoresistive element, the shield layer, and the shield section being exposed to the medium-sliding surface, wherein a smear-preventing layer is provided between the shield section and the core section in the shield core layer, the smear-preventing layer protruding from the medium-sliding surface further than at least the core section, the write head comprising:
a gap layer and a thin-film coil section deposited in that order on the shield core layer; and
a magnetic core layer, which is magnetically coupled to the core section, deposited over the gap layer and the thin-film coil section so as to be insulated from the thin-film coil section, the core section, the gap layer, and the magnetic core layer being exposed to the medium-sliding surface to form a magnetic gap.

2. A magnetic head according to claim 1, wherein the medium-sliding surface comprises an insulating sliding-surface layer provided on the periphery of the MR head and the write head, and the smear-preventing layer protrudes from the medium-sliding surface further than the insulating sliding-surface layer.

3. A magnetic head according to claim 1, wherein the smear-preventing layer comprises $SiO_2$.

4. A magnetic head according to claim 1, wherein the shield core layer comprises a shield film containing the shield section and a core film containing the core section, and the shield film and the core film are connected with each other in a section not provided with the smear-preventing layer.

5. A magnetic head according to claim 1, wherein the shield core layer comprises a shield film containing the shield section and a core film containing the core section, and the shield film and the core film are separated by the smear-preventing layer.

6. A magnetic head according to claim 1, wherein the write head is placed upstream in the sliding direction of the magnetic recording medium and the MR head is placed downstream thereof.

7. A magnetic head according to claim 2, wherein the smear-preventing layer comprises a wear resistant material having higher wear resistance to the magnetic recording medium than the wear resistance of the insulating sliding-surface layer.

8. A magnetic head according to claim 2, wherein the insulating sliding-surface layer comprises $Al_2O_3$.

9. A magnetic head according to claim 7, wherein the smear-preventing layer comprises $SiO_2$.

10. A magnetic head comprising an MR head and a write head which are exposed to a medium-sliding surface, the MR head comprising a magnetoresistive element and sliding over a magnetic recording medium to read information magnetically recorded in the magnetic recording medium, the MR head further comprising:
  a shield layer provided on one side in the thickness direction of the magnetoresistive element; and
  a shield core layer comprising a shield section and a core section provided on the other side in the thickness direction of the magnetoresistive element, the magnetoresistive element, the shield layer, and the shield section being exposed to the medium-sliding surface,
wherein a smear-preventing layer is provided between the shield section and the core section in the shield core layer, the smear-preventing layer having a higher hardness than that of at least the core section, and protruding from the medium-sliding surface, the write head comprising:
  a gap layer and a thin-film coil section deposited in that order on the shield core layer; and
  a magnetic core layer, which is magnetically coupled to the core section, deposited over the gap layer and the thin-film coil section so as to be insulated from the thin-film coil section, the core section, the gap layer, and the magnetic core layer being exposed to the medium-sliding surface to form a magnetic gap.

11. A magnetic head according to claim 10, wherein the medium-sliding surface comprises an insulating sliding-surface layer provided on the periphery of the MR head and the write head, and the smear-preventing layer comprises a wear resistant material having higher wear resistance to the magnetic recording medium than the wear resistance of the insulating sliding-surface layer.

12. A magnetic head according to claim 11, wherein the insulating sliding-surface layer comprises $Al_2O_3$.

13. A magnetic head according to claim 10, wherein the smear-preventing layer comprises $SiO_2$.

14. A magnetic head according to claim 10, wherein the shield core layer comprises a shield film containing the shield core section and a core film containing the core section, and the shield film and the core film are connected with each other in a section not provided with the smear-preventing layer.

15. A magnetic head according to claim 10, wherein the shield core layer comprises a shield film containing the shield section and a core film containing the core section, and the shield film and the core film are separated by the smear-preventing layer.

16. A magnetic head according to claim 10, wherein the write head is placed upstream in the sliding direction of the magnetic recording medium and the MR head is placed downstream thereof.

* * * * *